Aug. 5, 1924.

K. AKASHI 1,503,934

DRAWING COMPASSES

Filed Sept. 2, 1921

WITNESSES:

INVENTOR:

Patented Aug. 5, 1924.

1,503,934

UNITED STATES PATENT OFFICE.

KAZUE AKASHI, OF TOKYO, JAPAN.

DRAWING COMPASSES.

Application filed September 2, 1921. Serial No. 498,064.

*To all whom it may concern:*

Be it known that KAZUE AKASHI, a subject of the Emperor of Japan, residing at No. 2 Shichikencho, Asakusa-ku, Tokyo, Japan, has invented certain new and useful Improvements in Drawing Compasses, of which the following is a specification.

This invention relates to a drawing compass and more especially to an improvement in the construction of compass joint, and comprises a pair of heads arranged side by side clamped by a yoke with an intervention of metal balls, the heads being preferably manufactured separately from the legs and then joined together.

The object of the invention is to produce a perfectly smooth working compass joint with such a construction as will render the economical mass production of compasses easily attainable.

A straightener device for keeping the handle erect can, if desired, be attained by simply cutting teeth along the sides of the heads, and gearing them with each other.

Figure 1:
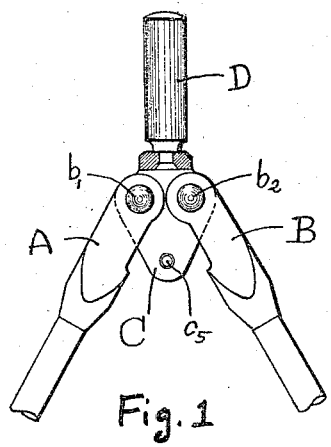
Figure 2:
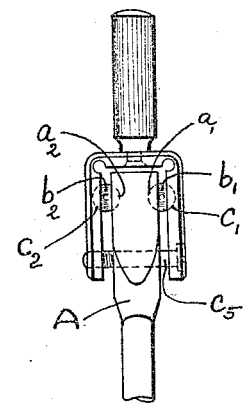
Figure 3:
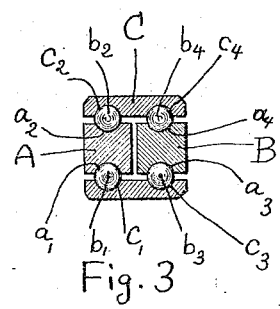
Figure 4:
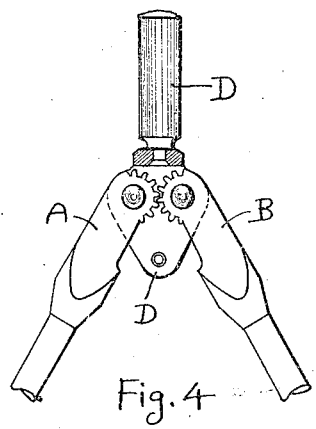

In the drawings, Fig. 1 is the elevation, partly in section, of the compass joint according to the invention, Fig. 2 is the side elevation, Fig. 3 a sectional plan, and Fig. 4 is the elevation partly in section of a modification of the joint with handle straightener device.

As shown in the drawings, the joint of the drawing compass is composed of two heads A and B, one yoke C and four metal balls $b_1$, $b_2$, $b_3$, $b_4$.

According to this invention, the heads A and B are arranged side by side in one plane, and they do not lap with each other. The form of the head has in consequence been made very simple, having neither stepped nor forked ends as in the heads of pivot or tongue joints. The heads are preferably manufactured separately from the legs, and are then joined together in a suitable way.

Each head of the compass has respectively a recess on each face; i. e.: recesses $a_1$ and $a_2$ on the head A and recesses $a_3$ and $a_4$ on the head B. The recesses are so located that the line passing through the centres of $a_1$ and $a_2$ shall be at right angles to the faces of the heads and parallel with the line passing through the centres of $a_3$ and $a_4$.

The yoke C has on the inner surface of each of its sides a pair of recesses i. e.: $c_1$, $c_3$ on one and $c_2$, $c_4$ on the other, these recesses being arranged in such positions that each will just face to the recess on the head with the same suffix; for instance, so that $a_1$ shall face to $c_1$, $a_2$ to $c_2$ and so on. Between the four sets of recesses on the heads and yoke as described above, i. e. between $a_1$ and $c_1$, $a_2$ and $c_2$, $a_3$ and $c_3$, $a_4$ and $c_4$, four metal balls $b_1$, $b_2$, $b_3$, $b_4$ are interposed and the ends of the yoke are clamped together by means of a screw bolt $c_5$.

The balls, unlike ball bearings, do not roll, but make sliding contact with the heads and the yoke, thus giving proper friction therebetween by the adjustment of the screw bolt $d$.

The two heads A and B of the compass joint do not make direct contact with each other, but their motion and in consequence the motion of the compass legs is perfectly restricted to lie in one plane by means of the yoke C and the balls $b_1$, $b_2$, $b_3$, $b_4$, the centres of the balls on each head being located in parallel lines with each other.

The yoke C is preferably in the form of a U and includes a web and depending side members. The corners or shoulders defined at the points of juncture of the side members and the web being thinned and made elastic, so that the wear which may take place on the contact surfaces of the joint can be taken up by tightening the clamping bolt $d$, and the movement of the joint can be kept always in good condition. The balls are usually made of hardened steel, and so they will practically not wear at all, the recesses only being slightly deepened incident to the prolonged use of the compass.

From the above explanation it will be evident that the parts composing the compass have been exceedingly simplified in construction, all of them being of such a shape as will permit economical mass production by the construction of special automatics or semi-automatics. This is a feature which has been practically unattainable with any compasses of older design, because they are composed of parts too much irregular in shape.

The device for keeping the handle D centered can, if desired, be easily attained merely by cutting teeth on the sides of the heads A and B, and gearing them with each other. Fig. 4 shows the compass with this handle centering device.

Claims:—

1. In a compass, a yoke member, movable legs, and spherical fulcrum members pivotally mounting each leg in the yoke member independently of the other leg.

2. In a compass, a yoke member, movable legs, spherical fulcrum members arranged on opposite sides of and pivotally mounting each leg in the yoke member independently of the other leg, and means associated with said yoke member for expanding and contracting the latter whereby to simultaneously and to the same extent vary the pressure exerted by the yoke member on the spherical fulcrum members of both legs.

3. In a compass, a yoke member, movable legs, said yoke member being sustantially U-shaped and including spaced parallel members, spherical fulcrum members pivotally mounting each leg in the yoke member independently of the other leg, and means connecting the parallel members of the U-shaped yoke members and operable simultaneously and to the same degree varying the pressure exerted by the yoke member on the spherical fulcrum member.

4. In a compass, a yoke member, movable legs, spherical fulcrum members pivotally mounting each leg and the yoke member independently of the other leg, and intermeshing gear teeth carried by the pivotal extremities of the legs adapted to transmit the movement of one leg to the other leg whereby both legs are maintained in corresponding angular position with respect to the yoke member.

In testimony whereof he affixes his signature.

KAZUE AKASHI.